US010384777B1

(12) United States Patent
Welsh

(10) Patent No.: US 10,384,777 B1
(45) Date of Patent: Aug. 20, 2019

(54) TETHERING SYSTEM FOR UNMANNED AERIAL VEHICLES

(71) Applicant: Amazon Technologies, Inc., Seattle, WA (US)

(72) Inventor: Ricky Dean Welsh, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 287 days.

(21) Appl. No.: 14/633,502

(22) Filed: Feb. 27, 2015

(51) Int. Cl.
*B64C 39/02* (2006.01)
*B64F 3/02* (2006.01)

(52) U.S. Cl.
CPC .............. *B64C 39/022* (2013.01); *B64F 3/02* (2013.01); *B64C 2201/148* (2013.01)

(58) Field of Classification Search
CPC ......... B64C 39/022; B64F 3/02; A63H 27/00; A63H 27/002; A63H 27/04; A63H 27/06; A63H 27/08
See application file for complete search history.

(56) References Cited

U.S. PATENT DOCUMENTS

| | | | | |
|---|---|---|---|---|
| 1,385,634 A * | 7/1921 | Marshall | ............. | A63H 27/004 446/228 |
| 2,793,860 A * | 5/1957 | De Crescenzo | ...... | A63F 9/0247 104/89 |
| 3,041,983 A * | 7/1962 | Liversidge | ............. | A63H 21/02 104/288 |
| 3,087,257 A * | 4/1963 | White | ..................... | A63H 27/04 434/15 |
| 3,838,855 A * | 10/1974 | Becker | .................... | A63H 27/04 273/331 |
| 3,863,385 A * | 2/1975 | Becker | .................... | A63H 27/04 446/228 |
| 3,864,868 A * | 2/1975 | Wolf | ..................... | A63H 27/12 446/229 |
| 3,953,938 A * | 5/1976 | Kilgore | .................. | A63H 19/24 104/93 |
| 4,037,358 A * | 7/1977 | Rosenbaum | ........... | A63H 30/02 40/414 |
| 4,137,665 A * | 2/1979 | Bierwiler | ................ | A63J 19/00 446/444 |
| 4,251,040 A * | 2/1981 | Loyd | ..................... | B64C 39/022 244/1 R |
| 4,719,725 A * | 1/1988 | Weiner | ..................... | G09F 23/06 186/57 |

(Continued)

FOREIGN PATENT DOCUMENTS

WO   WO 2013156680 A1 * 10/2013   ........... B64C 39/022

*Primary Examiner* — Michael H Wang
(74) *Attorney, Agent, or Firm* — Athorus, PLLC

(57) ABSTRACT

This disclosure describes a tethering system in which an unmanned aerial vehicle is attached by a tether to a movable tethering apparatus (e.g., a small cart or other mechanism) which rolls or slides along a guiding portion (e.g., a pipe, track, trough, cable, etc.). In various implementations, the guiding portion may be on or near the ground wherein the unmanned aerial vehicle flies above the guiding portion, or alternatively the guiding portion may be attached a ceiling or other elevated structure wherein the tether allows the unmanned aerial vehicle to fly below but is short enough so as to prevent the unmanned aerial vehicle from impacting the ground. In various implementations, the guiding portion may provide electricity that is conducted through the tether for powering the flight of the unmanned aerial vehicle.

22 Claims, 10 Drawing Sheets

(56) References Cited

U.S. PATENT DOCUMENTS

| | | | | |
|---|---|---|---|---|
| 4,817,937 A * | 4/1989 | Ozeki | ................... | G09B 23/10 446/30 |
| 4,981,456 A * | 1/1991 | Sato | ................... | B64C 39/022 244/17.13 |
| 5,102,126 A * | 4/1992 | Nguyen | ................ | A63H 21/02 273/454 |
| 5,104,344 A * | 4/1992 | Jancso, Jr. | ............. | A63H 27/04 446/30 |
| 5,231,932 A * | 8/1993 | Enderlein | ........... | B65G 19/025 104/162 |
| 5,626,504 A * | 5/1997 | Liu | ........................ | A63H 21/02 104/118 |
| 5,709,580 A * | 1/1998 | Stanzel | ................. | A63H 27/04 446/31 |
| 5,956,880 A * | 9/1999 | Sugimoto | ............ | A01M 29/06 116/22 A |
| 6,058,849 A * | 5/2000 | Ostholt | .................... | B66C 7/04 104/139 |
| 6,286,786 B1 * | 9/2001 | Le Gette | ............... | A63H 27/08 244/153 R |
| 6,520,830 B1 * | 2/2003 | Vollmar | ................. | A63H 21/02 104/93 |
| 6,620,018 B1 * | 9/2003 | Chao | ..................... | A63H 27/06 446/30 |
| 8,350,403 B2 * | 1/2013 | Carroll | .................. | B64C 39/022 290/44 |
| 8,978,905 B2 * | 3/2015 | Bergenstråle | ........ | A61G 7/1042 212/324 |
| 9,114,324 B2 * | 8/2015 | Chuang | .................. | A63H 19/24 |
| 2011/0172871 A1* | 7/2011 | Hall | ...................... | B60W 50/14 701/31.4 |
| 2011/0180667 A1* | 7/2011 | O'Brien | ............... | B64C 39/022 244/135 R |
| 2011/0278393 A1* | 11/2011 | Bland | ...................... | B64B 1/50 244/1 TD |
| 2012/0303179 A1* | 11/2012 | Schempf | ................ | B25J 11/002 701/2 |
| 2014/0361122 A1* | 12/2014 | Ruiterkamp | .............. | F03D 5/00 244/154 |
| 2015/0041598 A1* | 2/2015 | Nugent | .................. | H02J 17/00 244/53 R |
| 2016/0144958 A1* | 5/2016 | Woodworth | ........... | B64C 37/02 244/139 |
| 2016/0200437 A1* | 7/2016 | Ryan | .................... | B64C 39/022 244/99.2 |
| 2016/0318607 A1* | 11/2016 | Desai | ...................... | B64D 1/16 |

* cited by examiner

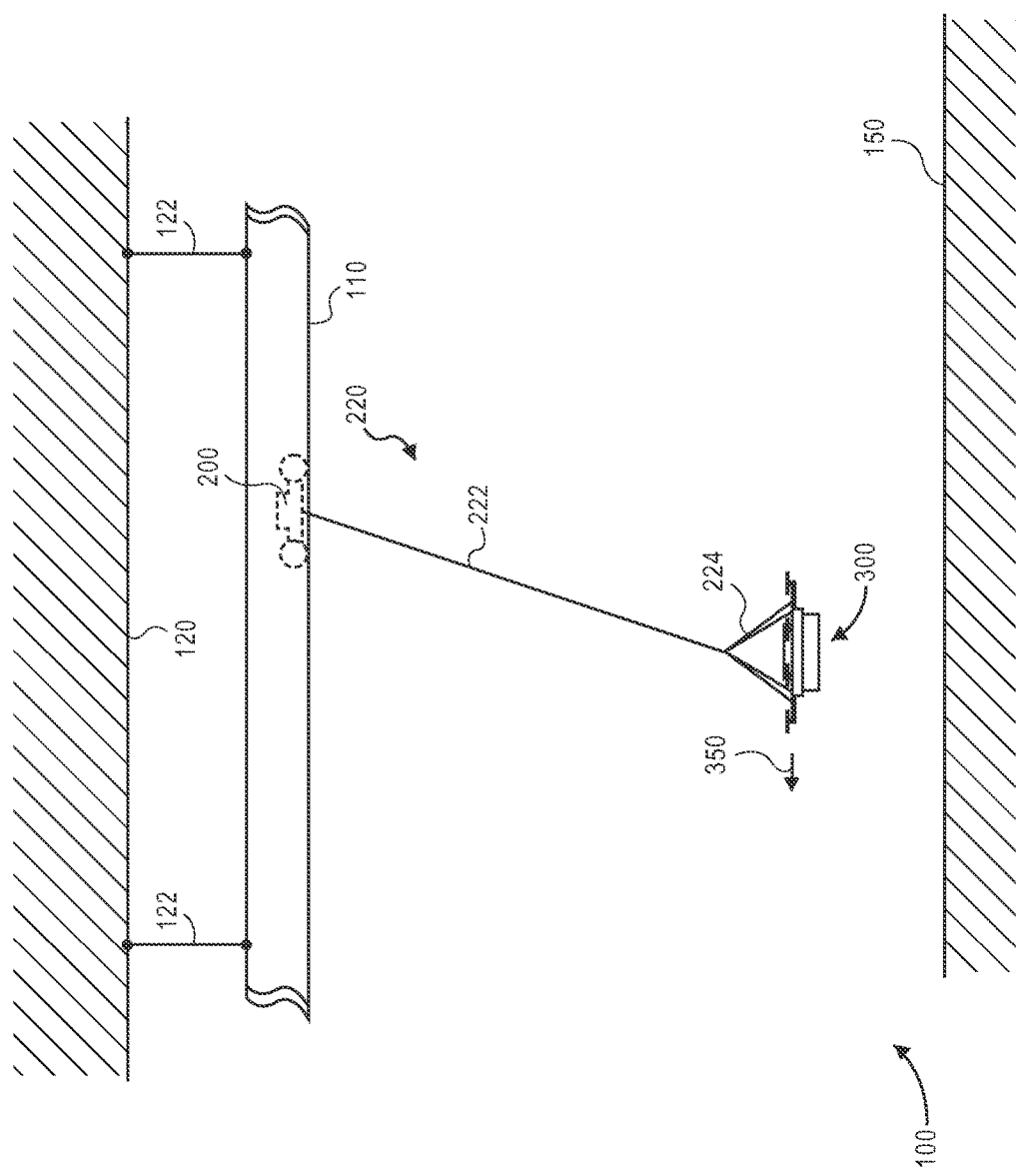

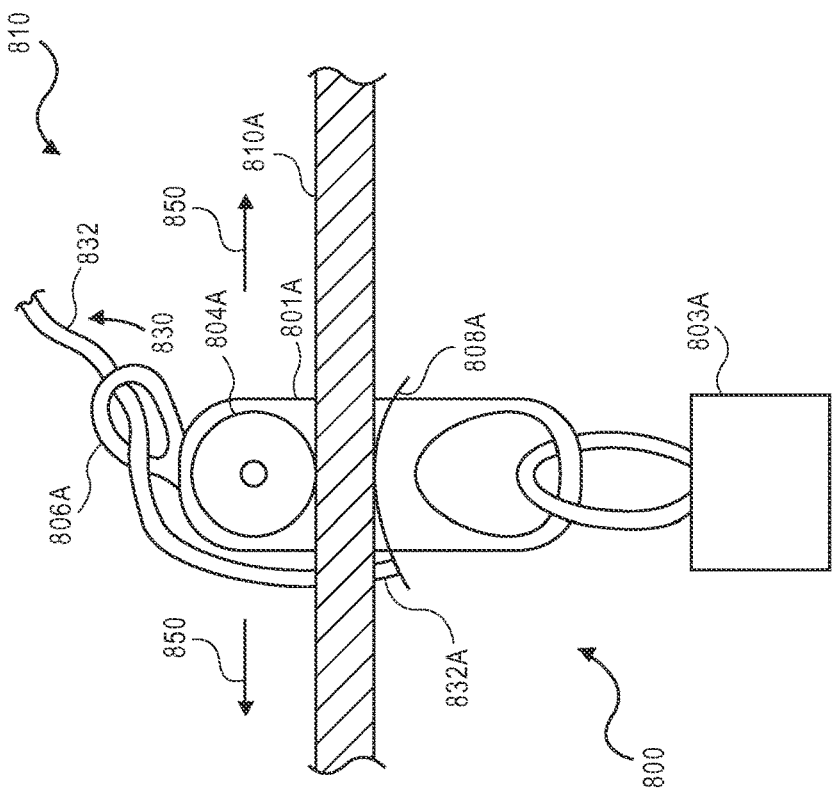
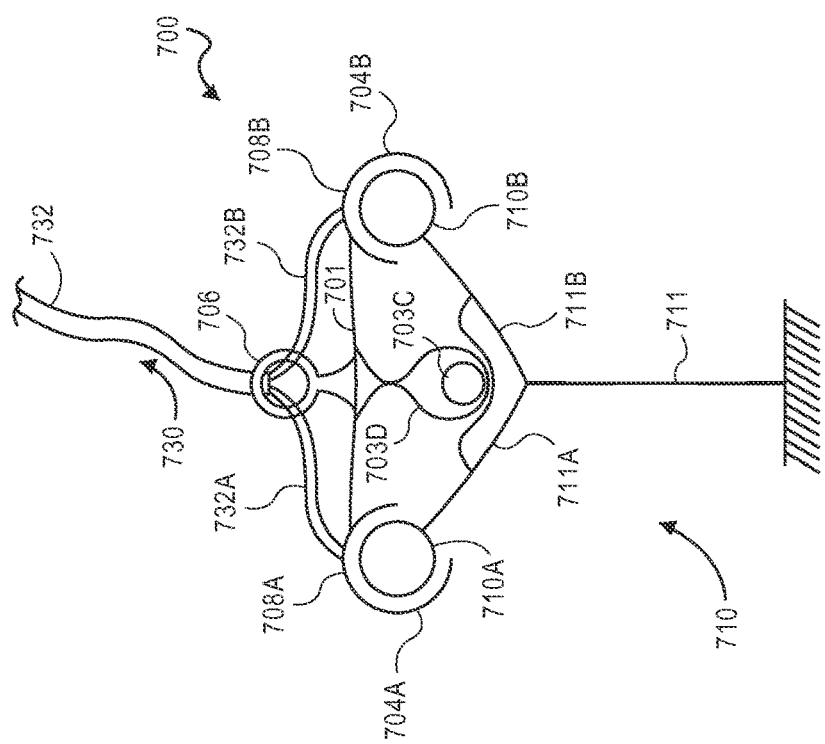
FIG. 8
FIG. 7

TETHERING SYSTEM FOR UNMANNED AERIAL VEHICLES

BACKGROUND

Unmanned aerial vehicles are continuing to increase in use. For example, unmanned aerial vehicles are often used for surveillance. While there are many beneficial uses of unmanned aerial vehicles, they also have many drawbacks. For example, unmanned aerial vehicles are often expensive, and may be damaged or lost during test flights. Government or other regulations may also limit the ability to fly unmanned aerial vehicles under certain conditions or in certain areas (e.g., preventing certain types of commercial flights from being performed outdoors). As a result, various types of commercial testing may be required to be performed indoors, which may increase the risk of crashes or other damage due to the spatial limitations of indoor facilities that are utilized for the test flights.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 depicts a diagram of a tethering system with an unmanned aerial vehicle attached by a tether to a movable tethering apparatus that moves along a guiding portion, according to an implementation.

FIG. 7 depicts a diagram of a movable tethering apparatus including a clip for maintaining sliding contact with a guiding portion, according to an implementation.

FIG. 8 depicts a diagram of a movable tethering apparatus including a pulley for maintaining rolling contact with a guiding portion, according to an implementation.

Figure 2A:
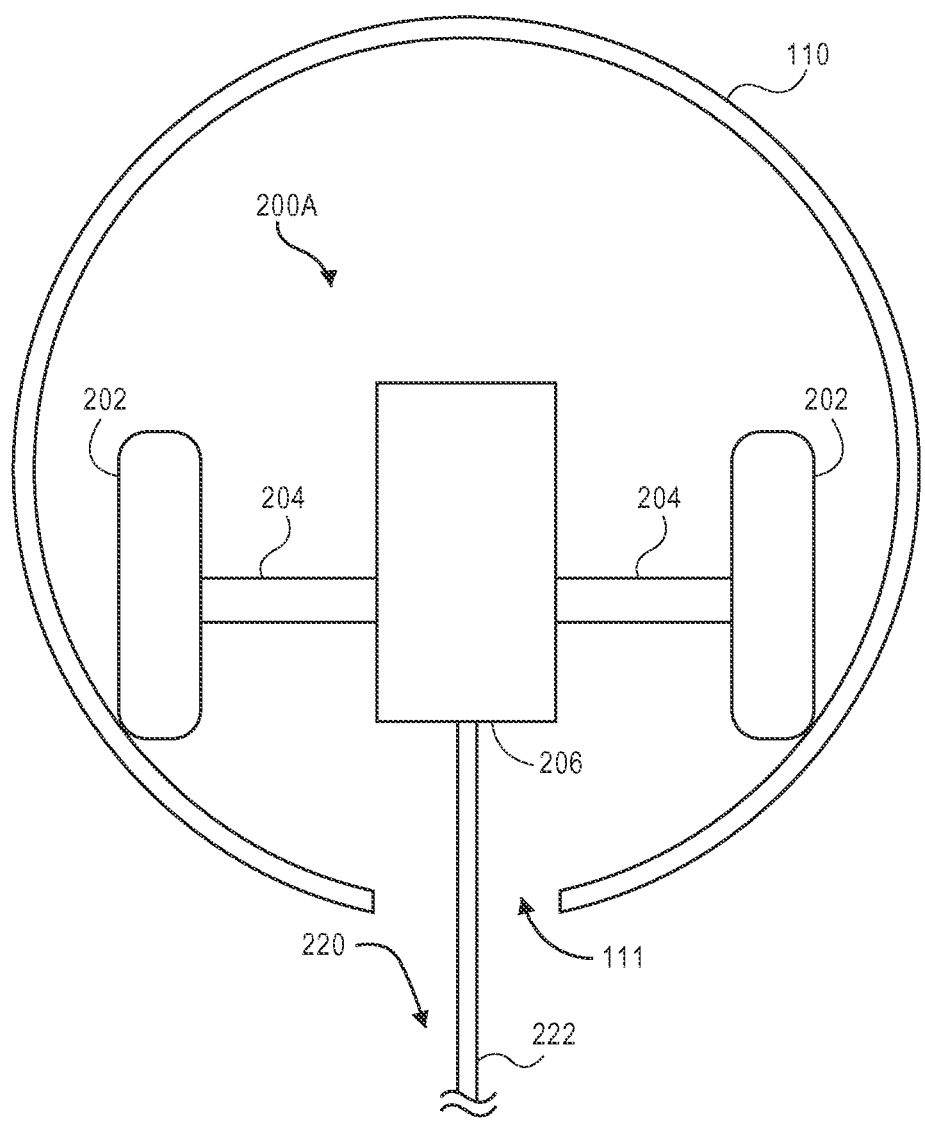
FIGS. 2A and 2B depict diagrams of a movable tethering apparatus including wheels for rolling along a guiding portion, according to some implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a tethering system for use with an unmanned aerial vehicle ("UAV"). In various implementations, the UAV may be attached by a tether to a movable tethering apparatus (e.g., a small cart or other mechanism) which rolls or slides along a guiding portion (e.g., a pipe, track, trough, cable, etc.). In various implementations, the guiding portion may be on or near the ground wherein the UAV generally flies above the guiding portion, or alternatively the guiding portion may be attached to a ceiling or other elevated structure wherein the UAV generally flies below the guiding portion.

In configurations where the UAV generally flies below the guiding portion, the tether may be made shorter than the distance from the guiding portion to the ground, so as to prevent the UAV from impacting (e.g., crashing into) the ground during testing or other flights of the UAV. In various implementations, the tether may also have a structure that helps distribute the load on the UAV frame and which is intended to keep the UAV relatively upright when the tether is fully extended. For example, a multi-point harness (e.g., three-point, four-point, etc.) may be utilized as the end of the tether and which is attached at distributed locations on the UAV frame. Such a configuration may help prevent the UAV from rotating sideways at the end of the tether, which could cause the edge of the UAV to impact the ground and/or complicate the process for starting another test flight for the UAV (e.g., due to the UAV being in a sideways rather than in an upright orientation at the end of the tether). In addition, the multi-point harness configuration may also help distribute the load across the frame of the UAV (e.g., as opposed to a single attachment point which could cause undesirable amounts of stress on a single point of the UAV frame when the UAV falls or otherwise reaches the full extension of the tether with significant force). The multi-point harness configuration also provides an alternative to attaching the tether at the center of the UAV (e.g., wherein certain electronics or other components may typically be located at the center of the UAV that would complicate an attachment of the tether at the center).

In various implementations, the guiding portion may be attached to a ceiling or other elevated structure. For example, a guiding portion in the form of a pipe (e.g., an eight inch PVC pipe) may be attached to a ceiling by cables or other attachment mechanisms. In such a configuration, the movable tethering apparatus (e.g., a small cart or other sliding mechanism) may move along inside the guiding portion. In such configurations, the tether may extend downward from the movable tethering apparatus through a slit or other opening along the bottom of the guiding portion.

In various implementations, a tether retraction mechanism may be utilized to retract any slack portions of the tether and/or otherwise keep a steady tension on the tether as the UAV flies. For example, the tether retraction mechanism may include a spring-loaded spool or other mechanism onto which the tether is wound when the UAV flies closer to the tether retraction mechanism, and which allows the tether to be pulled out as it is unwound as the UAV flies further away. In various implementations, as will be described in more detail below, the UAV may begin a flight from a resting position wherein the UAV is hanging in the air beneath the movable tethering apparatus as supported at a full extension of the tether with the tether fully unwound from the tether retraction mechanism. In such a configuration, at the beginning of the flight the tether may initially begin to be wound onto the spring-loaded spool or other mechanism as the UAV flies upward and closer to the tether retraction mechanism, after which the tether may be unwound as the UAV flies further away from the tether retraction mechanism. It will be appreciated that such a tether retraction mechanism may help avoid slack portions of the tether, which could become caught or tangled in various elements (e.g., propellers of the UAV, other structures in the flight area, etc.).

In various alternative implementations where the UAV is generally intended to fly above the guiding portion, the length of the tether may limit the height and range to which the UAV is able to fly while attached to the tether. In such configurations, the guiding portion may be on or near the ground. For example, the guiding portion may include a pair of cables that are on or near the ground and which the movable tethering apparatus slides along as it is pulled from above by a flying UAV.

In various implementations, the tethering system may provide electricity for powering the flight of the UAV. For example, a pair of cables that is utilized for the guiding portion may be made to conduct electricity. In such a configuration, the movable tethering apparatus may include electrical contact portions for electrically coupling to the guiding portion, and the electricity may be conducted through the tether (e.g., including a pair of wires that are electrically coupled to the UAV). Such configurations may allow for continuous flight of the UAV (e.g., for endurance testing, etc.) without requiring a recharging of batteries or other on-board power supplies of the UAV. In various implementations, such configurations may also be utilized for addressing certain government or other regulations regarding outdoor flight. For example, a configuration where the UAV is unable to fly without attachment to the tether (e.g., which provides the electricity for powering the flight) may help address certain government or other regulations that restrict the untethered commercial flight of UAVs outdoors. In various implementations, other types of electrical signals may also be transmitted to/from the UAV over the tether. For example, data may be transmitted from the UAV and/or command signals (e.g., navigation commands) may be sent to the UAV over the tether.

In various implementations, an emergency landing procedure may be utilized if the UAV becomes disconnected from the tethering system. For example, if the tether breaks or if the movable tethering apparatus is pulled off of the guiding portion, it may be desirable for the UAV to land immediately. In various implementations, the UAV or other elements of the tethering system may be configured to sense when a disconnection has occurred and in response to initiate an immediate landing of the UAV. Alternatively or in addition, the landing of the UAV may be forced if the UAV loses power (e.g., if the flight of the UAV is powered by electricity from the tethering system which has been disconnected). In such configurations, the UAV may include an emergency power supply (e.g., a capacitor, small battery, other energy storage device, etc.) that may be utilized exclusively for powering the UAV during an emergency landing.

In various implementations, various additional features may also be included in the tethering system. For example, the overall friction of the tethering system (e.g., including the rolling or sliding of the movable tethering apparatus along the guiding portion) may be made to be relatively low so as to have minimal impact on the flying of the UAV during testing or other flights of the UAV. As another example, the length of the guiding portion may be made to be relatively long (e.g., 100 feet, 500 feet, 1,000 feet, ¼ mile, etc.) as may be required for certain functions (e.g., testing a maximum straight-away flight speed of the UAV). For testing or other flights, the UAV or other elements of the tethering system may include sensors or other devices for measuring certain aspects regarding the flight (e.g., speed, energy efficiency, carrying capacity, maneuverability, forces exerted, etc.). The data from such flights may be transmitted by the UAV or other elements during the flight and/or stored for later access and evaluation after the flight.

FIG. 1 depicts a diagram of a side view of a tethering system 100, according to an implementation. As illustrated in FIG. 1, the tethering system 100 includes a UAV 300 attached by a tether 220 to a movable tethering apparatus 200 that moves along a guiding portion 110. Various implementations of the movable tethering apparatus 200 and guiding portion 110 will be described in more detail below with respect to FIGS. 2A and 2B, and various implementations of the UAV 300 will be described in more detail below with respect to FIGS. 3A and 3B. As illustrated in FIG. 1, the guiding portion 110 (e.g., an eight inch diameter PVC pipe) is attached by support cables 122 to a ceiling 120. In other implementations, the guiding portion 110 may be supported or attached utilizing different types of attachment mechanisms and/or may be attached to different types of elevated structures. For example, rather than flying indoors with a ceiling, an elevated structure (e.g., consisting of towers, poles, cross-beams, scaffolding, etc.) may be constructed for supporting the guiding portion 110 in an outdoor environment.

In various implementations, the movable tethering apparatus 200 may include wheels or otherwise be slidable for moving within or along the guiding portion 110. In various implementations, the guiding portion 110 may include a slot or other opening along the bottom through which the tether 220 may extend. In various implementations, the tether 220 may include various parts, such as an upper section 222 and a four-point harness 224 that attaches to the frame of the UAV 300, as will be described in more detail below.

During a flight of the UAV 300 (e.g., in a direction indicated by an arrow 350) the movable tethering apparatus 200 may be pulled to roll along inside the guiding portion 110 in the same direction that the UAV 300 is flying. The guiding portion 110 may thus define a path and may physically guide the travel of the movable tethering apparatus 200 along the path as the movable tethering apparatus 200 is pulled by the flying UAV 300. The overall length of the tether 220, including the upper portion 222 and the four-point harness 224, may be made to be shorter than the distance between the guiding portion 110 and the ground 150 so as to prevent the UAV 300 from impacting the ground 150 and potentially sustaining damage (e.g., even if the UAV loses power or flight control during test maneuvers, etc.).

In various implementations, the guiding portion 110 may be made of a sufficient length and shape so as to allow certain types of testing or other flight requirements of the UAV 300 to be performed. For example, for certain types of tests it may be desirable for the guiding portion to define a path that is approximately straight over the length of the path and to be at least 100 feet long (e.g., for allowing the UAV to reach certain speeds and to have sufficient room for certain testing maneuvers). In one configuration, if it is desired to test the maximum flight speed (e.g., 60 mph or more) of the UAV 300, the guiding portion 110 may be made long enough (e.g., 500 feet, 1000 feet, ¼ mile, etc.) to allow the UAV 300 to get up to its maximum flight speed (e.g., which may take several seconds or longer), and to allow the UAV 300 to continue to fly at its maximum flight speed for however long of a testing period is required. Alternatively, in other implementations the guiding portion may be relatively short (e.g., less than 50 feet, 25 feet, 10 feet, etc.) for other types of test flights and applications (e.g., for flying within a more spatially limited test flight cage, etc.). In various implementations, the guiding portion 110 may also be formed in an overall circular configuration (e.g., circling within an indoor area), which may be entirely circular, or have straight-away portions or other desired shapes or configurations for the continued testing or other tethered flights of the UAV 300.

While the examples discussed herein primarily focus on configurations in which the guiding portion is in the form of an elongated member which the movable tethering apparatus moves along, other configurations may also be utilized. For example, in an alternative configuration the movable tethering apparatus may be formed as an elongated bar with a fixed end that swivels within a guiding portion that is attached at a fixed point to a ceiling or other elevated structure. In such a configuration, the outer end of the movable tethering apparatus to which the tether is attached may rotate in a circular path around the fixed point. When a flying UAV is attached to the tether, the UAV may pull the outer end of the movable tethering apparatus around in a circular path to follow the UAV as it flies. In such a configuration, an overall circular range may thus be provided for the flight of the UAV as compared to the relatively linear range provided by some of the other configurations described herein. In general, it will be appreciated that these example configurations as well as other various other alternative configurations may be used to implement the principles disclosed herein.

FIG. 2A depicts a diagram of a cross-sectional end view of a movable tethering apparatus 200A including wheels 202 for rolling along within a guiding portion 110, according to an implementation. The guiding portion 110 (e.g. a PVC pipe) thus defines a path that the movable tethering apparatus 200A rolls along as the movable tethering apparatus 200A is pulled by a flying UAV that is attached to a tether 220 below. In certain configurations, it may be desirable for the path that is defined by the guiding portion 110 to be approximately straight over the length of the path (e.g., for testing maximum flight speeds of a UAV, etc.) As described above with respect to FIG. 1, in various implementations the guiding portion 110 may have a slot 111 cut along the length of the bottom. The upper section 222 of the tether which is attached to the movable tethering apparatus 200A may extend down through the slot 111.

As illustrated in FIG. 2A, the movable tethering apparatus 200A may include the wheels 202, a body 204 and a tether retraction mechanism 206. In various implementations, one or more sets of wheels 202 (e.g., two inline sets with two, three, four, etc. wheels in each set) may be included as attached to the body 204. The wheels 202 function as engaging elements of the movable tethering apparatus 200A which engage (e.g., roll along) the guiding portion 110. The type of wheels 202 that are utilized and the associated configuration may be selected for reducing the overall friction of the movable tethering apparatus 200A as it rolls along the inside of the guiding portion 110 so as to have minimal impact on the flying of a UAV 300 that is pulling the movable tethering apparatus 200A.

In various implementations, the tether retraction mechanism 206 is attached to the body 204 and may include a spring loaded spool onto which part of the tether section 222 is wound. The tether retraction mechanism 206 may allow the tether section 222 to be unwound from the spool when pulled by the UAV 300 flying further away, and may cause the tether section 222 to be rewound onto the spool when the UAV 300 flies closer. It will be appreciated that these operations of the tether retraction mechanism 206 may help prevent a slack portion of the tether section 222 from interfering with the flight of the UAV 300 (e.g., which could accidentally become caught in a propeller of the UAV 300, etc.).

Figure 2B:
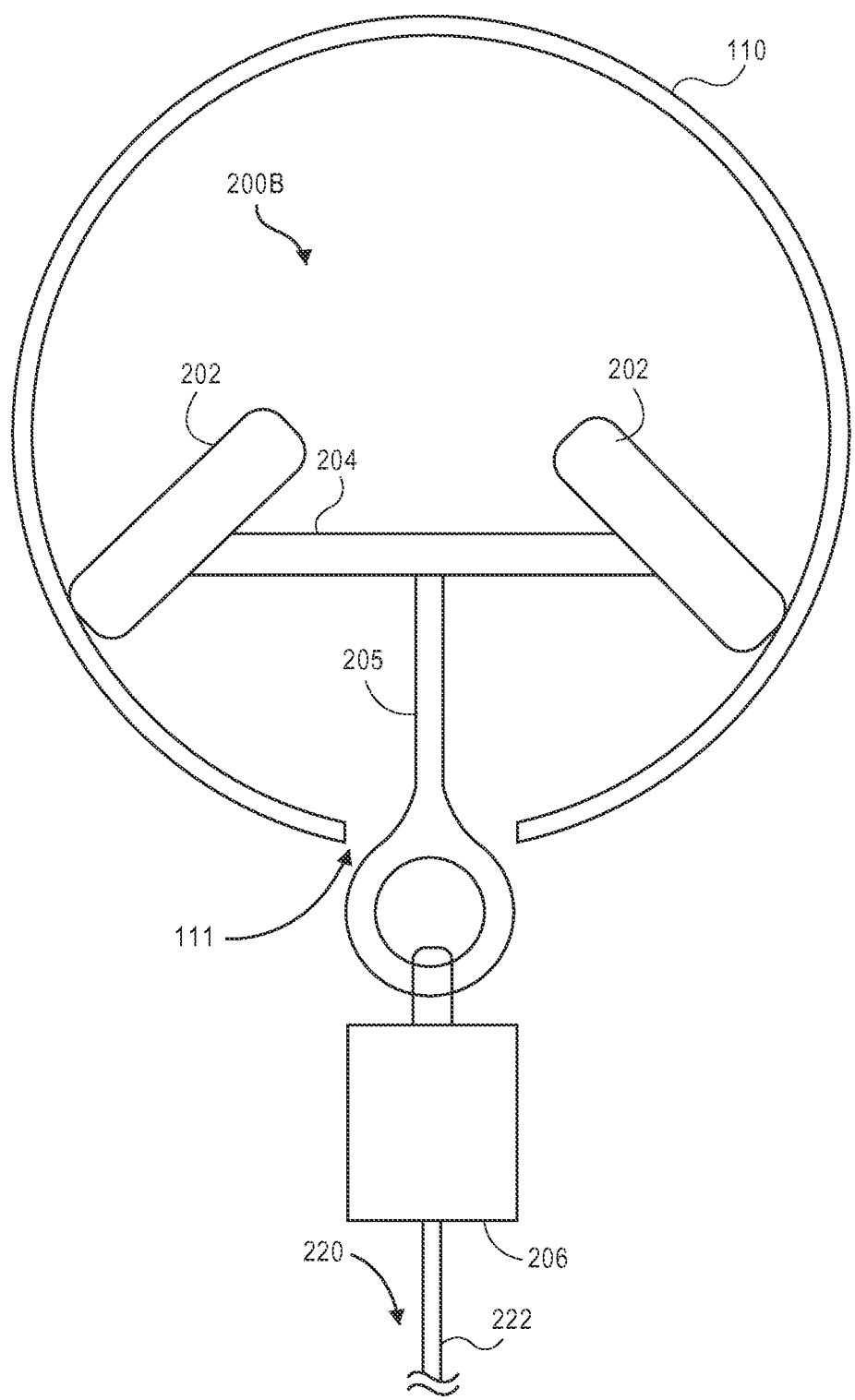

FIG. 2B depicts a diagram of a cross-sectional end view of a movable tethering apparatus 200B including wheels 202 for rolling along within the guiding portion 110, according to an alternative implementation. The movable tethering apparatus 200B includes similar components and will be understood to operate in a similar manner as the movable tethering apparatus 200A of FIG. 2A, except as otherwise described below. As illustrated in FIG. 2B, the wheels 202 are oriented at an angle (e.g., approximately 45 degrees) relative to the body 204, such that the wheels are generally more normal to the inner curved surface of the guiding portion 110 than in the implementation of FIG. 2A. In this configuration, the wheels 202 may have better traction and improved performance when rolling along the inner curved surface of the guiding portion 110, and the movable tethering apparatus 200B may correspondingly have an improved ability to remain centered when rolling along within the guiding portion 110. As also illustrated in FIG. 2B, the movable tethering apparatus 200B additionally includes an eye hook 205 that is attached to the body 204, and which extends down through the slot 111 in the guiding portion 110. The end of the eye hook 205 is thus located beneath the guiding portion 110 and is coupled to the tether retraction mechanism 206, which thus hangs below the guiding portion 110.

As described above with respect to FIG. 2A, the tether retraction mechanism 206 may include a spring loaded spool which allows the tether 220 to be retracted and pulled out, in accordance with the flying distance of the attached UAV 300. In various implementations, the extension of the eye hook 205 through the slot 111 may help prevent rotation of the movable tethering apparatus 200B within the guiding portion 110. For example, any rotation of the movable tethering apparatus 200B in a clockwise or counter-clockwise direction may effectively be stopped by the edge of the eye hook 205 coming into contact with the edge of the slot 111.

Figure 3A:
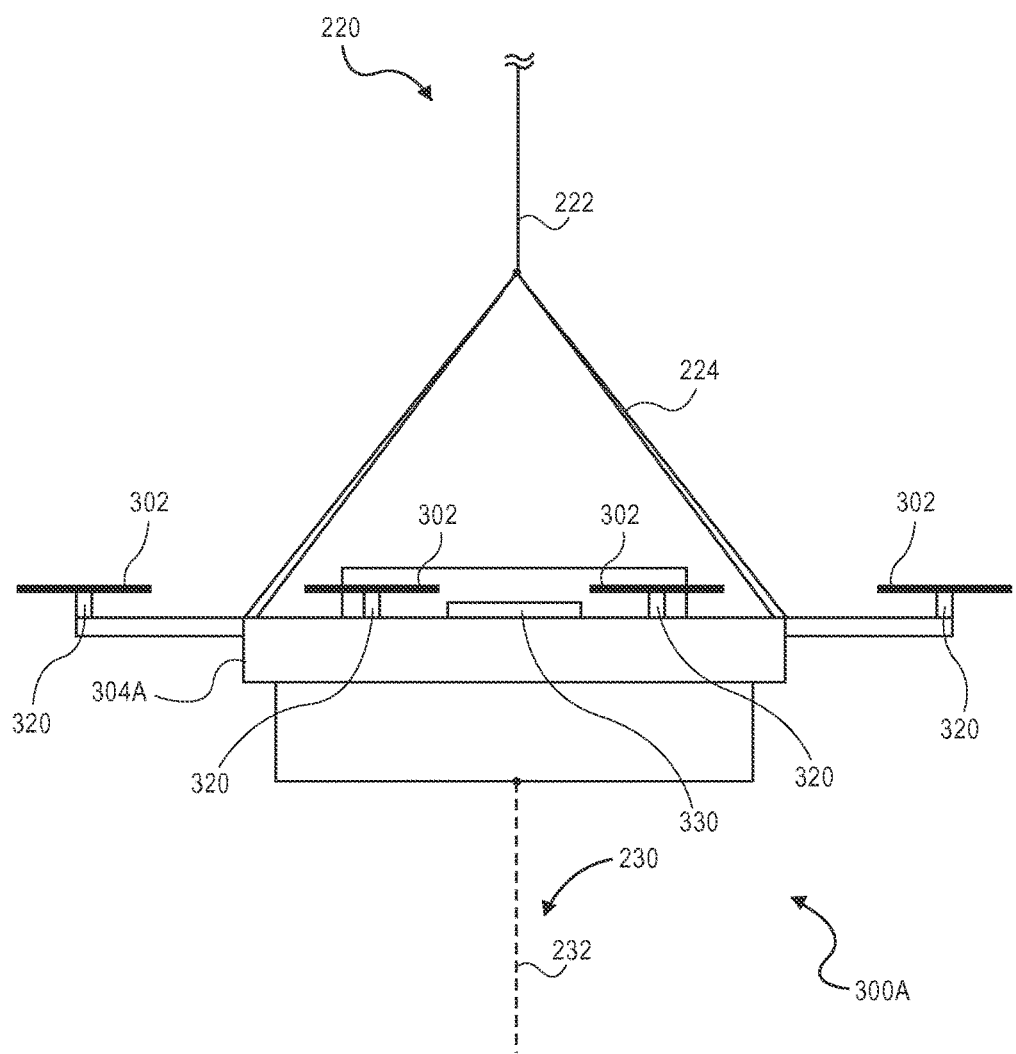
FIGS. 3A and 3B depict diagrams of an unmanned aerial vehicle as attached to a tether, according to some implementations.

FIG. 3A depicts a diagram of a side view of a UAV 300A as attached to a tether 220, according to an implementation. In the side view of the UAV 300A illustrated in FIG. 3A, four motors 320 and propellers 302 are visible that are utilized for flying the UAV 300A. In other implementations, additional or fewer motors 320 and/or propellers 302 may be included in the UAV 300A (e.g., an eight propeller configuration is described below with respect to FIG. 3B). As will be described in more detail below with respect to FIGS. 3B and 11, a control system 330 is utilized for controlling the motors 320 for flying the UAV 300A, as well as controlling other operations of the UAV 300A (e.g., determining and recording test flight data, communicating with a central control system, etc.)

The tether 220 includes an upper section 222 and a four-point harness 224 that is attached to a frame 304A of the UAV 300A. As will be described in more detail below with respect to FIG. 3B, various advantages may be associated with the utilization of the four-point harness 224. As will be described in more detail below with respect to FIGS. 4-8, in alternative implementations a tether section 232 may be attached to the bottom of the UAV 300A. For example, in an alternative implementation a guiding portion may be on or near the ground, for which the UAV 300A may generally fly above the guiding portion, for which a tether section 232 as part of a tether 230 may extend down from the UAV 300A for attachment to a movable tethering apparatus that rolls or slides along the guiding portion on the ground.

Figure 3B:
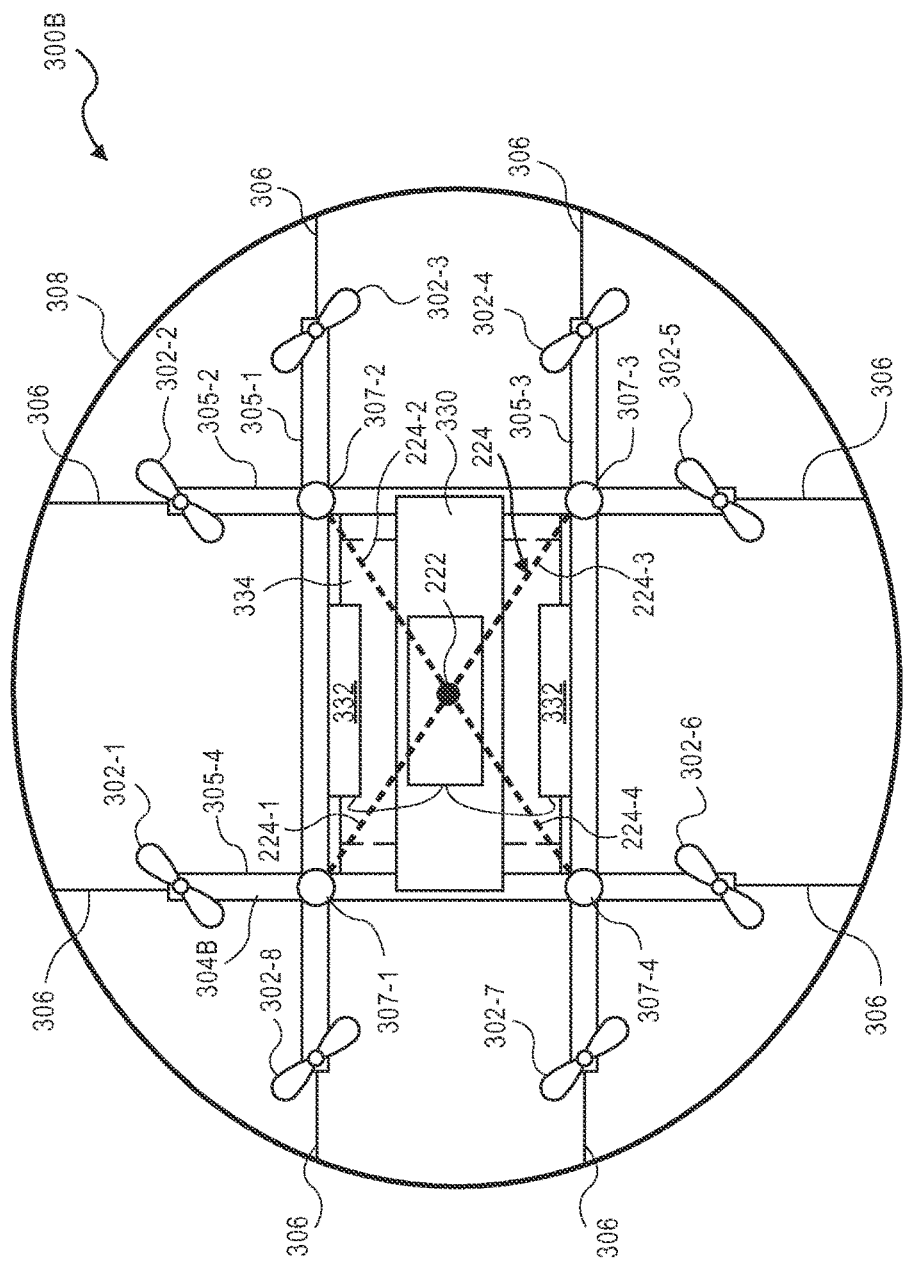

FIG. 3B depicts a diagram of a top-down view of a UAV 300B, as attached to a four-point harness 224 of a tether 220, according to an implementation. As illustrated in FIG. 3B, the UAV 300B includes eight propellers 302-1, 302-2, 302-3, 302-4, 302-5, 302-6, 302-7, 302-8 powered by propeller motors and spaced about the frame 304B as part of a propulsion system for the UAV. The propellers 302 may be any form of propeller (e.g., graphite, carbon fiber) and of a size sufficient to lift the UAV 300B and any items engaged by the UAV 300B (e.g. for testing carrying capacity of the UAV 300B) so that the UAV 300B can navigate through the air. While this example includes eight propellers, in other implementations, more or fewer propellers may be utilized for the propulsion system of the UAV 300B. Likewise, in some implementations, the propellers may be positioned at different locations on the UAV 300B. In addition, alternative methods of propulsion may be utilized. For example, fans, jets, turbojets, turbo fans, jet engines, and the like may be used to propel the UAV.

The frame 304B or body of the UAV 300B may likewise be of any suitable material, such as graphite, carbon fiber, and/or aluminum. In this example, the frame 304B of the UAV 300B includes four rigid members 305-1, 305-2, 305-3, 305-4, or beams arranged in a hash pattern with the rigid members intersecting and joined at approximately perpendicular angles. In this example, rigid members 305-1 and 305-3 are arranged parallel to one another and are approximately the same length. Rigid members 305-2 and 305-4 are arranged parallel to one another, yet perpendicular to rigid members 305-1 and 305-3. Rigid members 305-2 and 305-4 are approximately the same length. In some embodiments, all of the rigid members 305 may be of approximately the same length, while in other implementations, some or all of the rigid members may be of different lengths. Likewise, the spacing between the two sets of rigid members may be approximately the same or different.

While the implementation illustrated in FIG. 3B includes four rigid members 305 that are joined to form the frame 304, in other implementations, there may be fewer or more components to the frame 304. For example, rather than four rigid members, in other implementations, the frame 304B of the UAV 300B may be configured to include six rigid members. In such an example, two of the rigid members 305-2, 305-4 may be positioned parallel to one another. Rigid members 305-1, 305-3 and two additional rigid members on either side of rigid members 305-1, 305-3 may all be positioned parallel to one another and perpendicular to rigid members 305-2, 305-4. With additional rigid members, additional cavities with rigid members on all four sides may be formed by the frame 304. As discussed further below, a cavity within the frame 304B may be configured to include an engagement mechanism 334 for the engagement and transport of item(s) and/or containers that contain item(s). During tethered flights, items may be engaged for various purposes (e.g. for testing the carrying capacity, maneuverability with a load, etc. of the UAV).

The four-point harness 224 is illustrated as attached to the frame 304B at the intersection points of the four rigid members 305-1, 305-2, 305-3 and 305-4. The four-point harness has four legs 224-1, 224-2, 224-3 and 224-4, which are each illustrated as connected to one of the respective intersection point 307-1, 307-2, 307-3 and 307-4 of the four rigid members 305 of the frame 304B. An end view of the tether section 222 is illustrated as connected to the center of the four-point harness 224. It will be appreciated that the four-point harness 224 may help prevent the UAV 300B from rotating sideways at the end of the tether. For example, if a single attachment point were utilized, the given distribution of mass across the body of the UAV 300B relative to the attachment point could cause the UAV 300B to rotate sideways when at rest at the end of the tether. In such a configuration, one edge of the UAV 300B could be pointing down with an opposite edge pointing up, which could cause the lower edge of the UAV to impact the ground and/or complicate the process for starting another test flight for the UAV 300B due to the UAV 300B being in a sideways rather than an upright orientation at the end of the tether 220.

As another advantage of the four-point harness 224, the associated load for the attachment of the UAV 300B may be distributed across the frame of the UAV 300B. For example, the four different attachment points 307-1, 307-2, 307-3 and 307-4 may help distribute any stress that is placed on the frame 304B by the tether when the UAV 300B (e.g., which may be relatively heavy) falls or otherwise reaches the full extension of the tether 220 with significant force. The four attachment points 307-1, 307-2, 307-3 and 307-4 also provide an alternative to attaching a tether at the center of the UAV 300B, which may include certain electronics or other elements (e.g. the control system 330 and associated circuitry and components) that are typically located at the center of a UAV and which could complicate the attachment of a tether at the center.

In some implementations, the UAV may be configured for aerodynamics, such as may be tested during tethered flight of the UAV 300B. For example, an aerodynamic housing may be included on the UAV that encloses the UAV control system 330, one or more of the rigid members 305, the frame 304B and/or other components of the UAV 300B. The housing may be made of any suitable material(s) such as graphite, carbon fiber, aluminum, etc. Likewise, in some implementations, the engagement mechanism 334 may be configured such that, when an item is engaged, it is enclosed within the frame and/or housing of the UAV 300B so that no additional drag is created during transport of the item by the UAV 300B.

The propellers 302 and corresponding propeller motors are positioned at both ends of each rigid member 305. For item transport purposes, the propeller motors may be any form of motor capable of generating enough speed with the propellers to lift the UAV 300B and any engaged item thereby enabling aerial transport of the item. For example, for these purposes the propeller motors may each be a FX-4006-13 740 kv multi rotor motor.

Extending outward from each rigid member is a support arm 306 that is connected to a safety barrier 308. In this example, the safety barrier is positioned around and attached to the UAV 300B in such a manner that the motors and propellers 302 are within the perimeter of the safety barrier 308. The safety barrier may be plastic, rubber, etc. Likewise, depending on the length of the support arms 306 and/or the length, number or positioning of the rigid members 305, the safety barrier may be round, oval, or any other shape.

Mounted to the frame 304B is the UAV control system 330. In this example, the UAV control system 330 is mounted in the middle and on top of the frame 304B. The UAV control system 330, as discussed in further detail below with respect to FIG. 10, controls the navigation, communication and other operations of the UAV 300B. In various implementations, the UAV 300B may also include one or more power modules 332. In this example, the UAV 300B includes two power modules 332 that are removably mounted to the frame 304B.

In various implementations, the power module(s) for the UAV may be in the form of battery power, solar power, gas power, super capacitor, fuel cell, alternative power generation source, or a combination thereof. For example, the power modules 332 may each be a 6000 mAh lithium-ion polymer battery, polymer lithium ion (Li-poly, Li-Pol, LiPo, LIP, PLI or Lip) battery. The power modules 332 are coupled to and provide power for the UAV control system 330 and the propeller motors. As will be described in more detail below, in various implementations electricity for powering the flight of the UAV may alternatively or in addition be provided through a tether that is attached to the UAV.

As will also be described in more detail below, in various implementations one or both of the power modules 332 may be designated as emergency power supplies to be utilized exclusively for emergency landings if the UAV accidentally becomes disconnected from a tethering system that provides electricity for powering the flight of the UAV. In various implementations, the UAV and/or other components of the tethering system (e.g., the movable tethering apparatus, the tether, etc.) may also include circuitry for regulating the flow of electricity from the tethering system to the UAV. For example, circuitry may be included for ensuring that the voltage level remains relatively stable (e.g., reducing the effects of any voltage spikes, etc.) as the movable tethering apparatus moves along the guiding portion and the electricity is conducted through the various sliding or other electrical contact portions to the UAV.

As mentioned above, the UAV may also include an engagement mechanism 334. As noted above, items may be engaged during tethered flights (e.g. for testing the carrying capacity, maneuverability with a load, etc. of the UAV). The engagement mechanism 334 may be configured to engage and disengage items and/or containers that hold items. In this example, the engagement mechanism 334 is positioned within a cavity of the frame 304B that is formed by the intersections of the rigid members 305. The engagement mechanism 334 may be positioned beneath the UAV control system 330. In implementations with additional rigid members, the UAV may include additional engagement mechanisms and/or the engagement mechanism 334 may be positioned in a different cavity within the frame 304B. The engagement mechanism may be of any size sufficient to securely engage and disengage items and/or containers that contain items. The engagement mechanism communicates with (e.g., via wired or wireless communication) and is controlled by the UAV control system 330.

While the implementations of the UAV discussed herein utilize propellers to achieve and maintain flight, in other implementations, the UAV may be configured in other manners. For example, the UAV may include fixed wings and/or a combination of both propellers and fixed wings. In such configurations, the UAV may utilize one or more propellers to enable takeoff and landing and a fixed wing configuration or a combination wing and propeller configuration to sustain flight while the UAV is airborne.

As will be described in more detail below, FIGS. 4-8 depict diagrams of a tethering system in which the UAV is generally intended to fly above a guiding portion. In such configurations, the guiding portion may be on or near the ground. For example, the guiding portion may include one or more cables that are on or supported above the ground and which the movable tethering apparatus slides along as it is pulled by a tethered UAV that is flying above. In such configurations, the length of the tether may limit the height and range to which the UAV is able to fly while attached to the tether.

Figure 4:
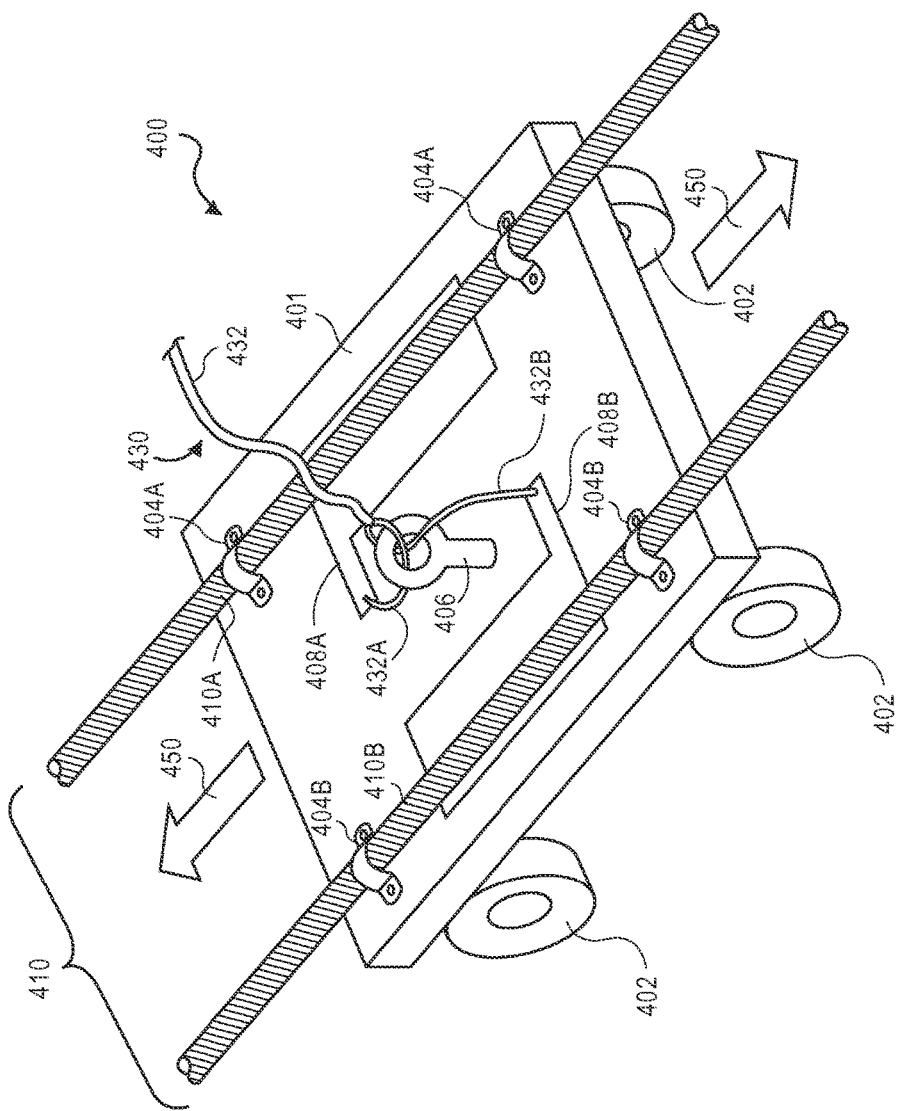
FIG. 4 depicts a diagram of a movable tethering apparatus including brackets for maintaining sliding contact with a guiding portion, according to an implementation.

FIG. 4 depicts a diagram of an isometric view of a movable tethering apparatus 400 including brackets 404 for maintaining sliding contact with a guiding portion 410, according to an implementation. As will be described in more detail below, the movable tethering apparatus 400 moves along a path that is indicated by arrows 450 and which is defined by the guiding portion 410 consisting of a pair of electrically conducting cables 410A and 410B which physically guide the movable tethering apparatus 400 along the path. The movable tethering apparatus 400 includes a body 401, wheels 402, brackets 404A and 404B, an eye hook 406 and electrical contact portions 408A and 408B. The wheels 402 are attached to the body 401 and allow the movable tethering apparatus 400 to roll along the path that is indicated by the arrows 450 when the movable tethering apparatus 400 is pulled along the cables 410A and 410B by a flying UAV 300 that is attached to the tether 430.

The two sets of brackets 404A and 404B slide along the cables 410A and 410B as the movable tethering apparatus 400 is pulled by a flying UAV 300. In this manner, the brackets 404A and 404B function as engaging elements of the movable tethering apparatus 400 which engage the cables 410A and 410B and enable the movable tethering apparatus 400 to move along the cables. The pair of electrical contact portions 408A and 408B on the body 401 electrically couple to the cables 410A and 410B as the movable tethering apparatus 400 slides along the cables. The electrical contact portions 408A and 408B are coupled to wires 432A and 432B of a tether section 432 which is part of a tether 430 which carries electricity from the cables 410A and 410B for powering the flight of a UAV 300 that is attached to the other end of the tether 430 above (not shown). In various implementations, other types of electrical signals may also be transmitted to/from the UAV 300 over the tether 430. For example, data may be transmitted from the UAV 300 and/or command signals (e.g., navigation commands) may be sent to the UAV 300 over the tether 430.

With respect to the example UAV 300B of FIG. 3B, the electricity provided by the tether 430 may be utilized as an alternative or in addition to the power modules 332 for powering the flight of the UAV 300B. In various implementations, the tether 430 and tether section 432 may be comparable to the tether 230 and tether section 232 illustrated in FIG. 3A as attached to a bottom portion of a UAV 300A. As illustrated in FIG. 4, the eye hook 406 helps secure the attachment of the tether section 432 and the wires 432A and 432B to the movable tethering apparatus 400 as the tether 430 is pulled from above by a flying UAV.

In various implementations, the electrically conducting cables 410A and 410B may be located on, or supported above, the ground. For example, the cables 410A and 410B may be attached at their ends to supports located above the ground and may be provided with sufficient tension to generally remain off of the ground along their length. As an alternative example, the cables 410A and 410B may be on the ground, for which the wheels 402 and body 401 of the movable tethering apparatus 400 may be made to have a relatively low profile so as to allow the cables to rise up slightly as the movable tethering apparatus 400 moves beneath a given section of the cables 410A and 410B. Other contact mechanisms and support structures for similar cables will be described in more detail below with respect to FIGS. 5-8.

Figure 5:
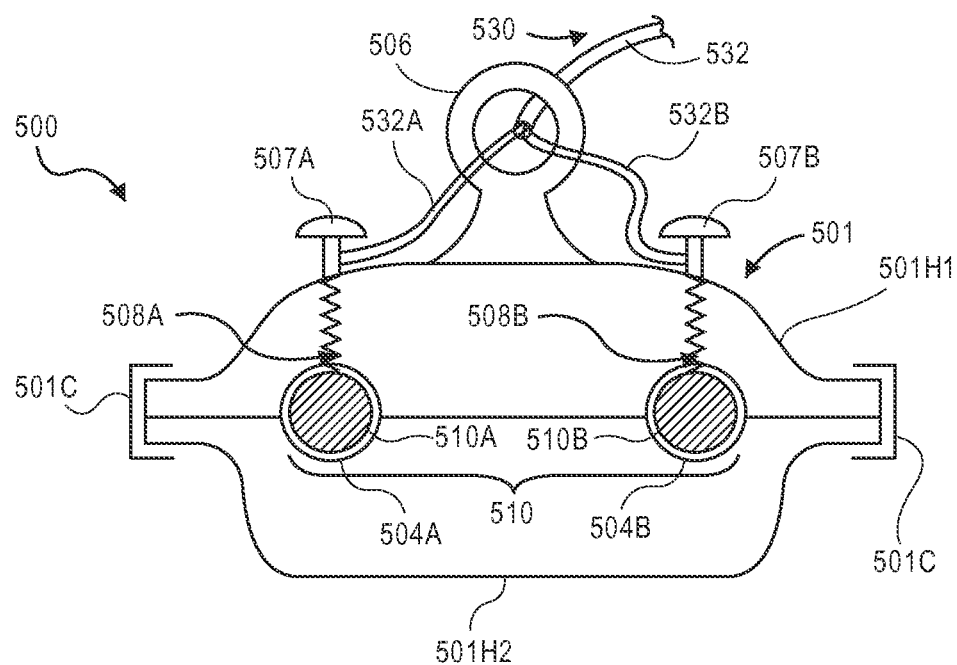
FIG. 5 depicts a diagram of a movable tethering apparatus including a clamshell configuration for maintaining sliding contact with a guiding portion, according to an implementation.

FIG. 5 depicts a diagram of a cross-sectional end view of a movable tethering apparatus 500 with a body 501 with a clamshell configuration for maintaining sliding contact with a guiding portion 510 which includes a pair of electrically conducting cables 510A and 510B, according to an implementation. As will be described in more detail below, during a flight of an attached UAV 300 the movable tethering apparatus 500 may be pulled by the flying UAV 300 so as to slide along the electrically conducting cables 510A and 510B (e.g., similar to the cables 410A and 410B of FIG. 4). The guiding portion 510 may thus define a path and may physically guide the travel of the movable tethering apparatus 500 along the path as it is pulled behind the flying UAV 300.

As illustrated in FIG. 5, the movable tethering apparatus 500 includes the body 501, circular openings 504A and 504B, an eye hook 506, electric posts 507A and 507B and electrical contact portions 508A and 508B. As noted above, the body 501 is formed in a clamshell configuration, including a top half 501H1, a bottom half 501H2 and a pair of side clips 501C for holding the top and bottom halves 501H1 and 501H2 together. When the clamshell configuration of the body 501 is closed as secured by the side clips 501C, in operation the circular openings 504A and 504B may slide along the cables 510A and 510B. In this manner, the circular openings 504A and 504B function as engaging elements of the movable tethering apparatus 500 which engage the cables 510A and 510B and enable the movable tethering apparatus 500 to move along the cables. The electric posts 507A and 507B are coupled by the electrical contact portions 508A and 508B (e.g., electric brushes) to the electrically conducting cables 510A and 510B as the movable tethering apparatus 500 slides along the cables.

A pair of wires 532A and 532B of a tether section 532 are connected to the electric posts 507A and 507B for conducting electricity through the tether 530 to an attached UAV 300 that flies above (not shown). The eye hook 506 helps secure the attachment of the tether section 532 and associated wires 532A and 532B to the movable tethering apparatus 500. In various implementations, the bottom half 501H2 of the body 501 may be made to have a lower surface that is designed to slide along the ground as the movable tethering apparatus 500 slides along the cables 510A and 510B. In alternative implementations, the lower half 501H2 may be provided with wheels (e.g., similar to the configuration of FIG. 4) or other mechanisms for reducing the resistance of the movement of the movable tethering apparatus 500.

In various implementations, the side clips 501C may be designed to open when a specified amount of force is applied for pulling on the top half 501H1 of the clamshell configuration. For example, if an attached UAV 300 pulls on the tether 530 with an excessive amount of force (e.g., such as if the UAV is attempting to fly beyond the range of the tethering system), the side clips 501C may be designed to open. The opening of the side clips 501C allows the top half 501H1 of the clamshell configuration to be pulled upward, which correspondingly decouples the electrical contact portions 508A and 508B from the cables 510A and 510B, which correspondingly stops the flow of electricity for powering the flight of the UAV 300. Such configurations may be intended to address at least in part certain government or other regulations that limit untethered outdoor flight, in that the UAV is correspondingly prevented from flying beyond the limits of the tethering system.

Figure 6:
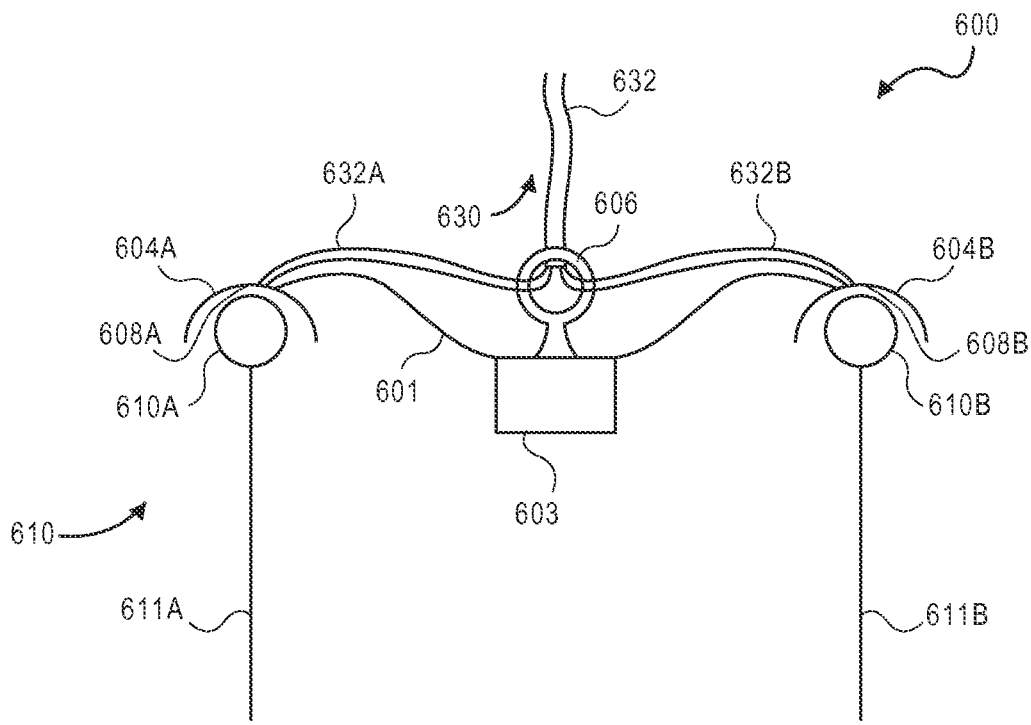
FIG. 6 depicts a diagram of a movable tethering apparatus including a weighted component for maintaining sliding contact with a guiding portion, according to an implementation.

FIG. 6 depicts a diagram of a cross-sectional end view of a movable tethering apparatus 600 including a weighted component 603 for maintaining sliding contact with a guiding portion 610 which includes a pair of electrically conducting cables 610A and 610B, according to an implementation. As will be described in more detail below, during a flight of an attached UAV 300, the movable tethering apparatus 600 may be pulled by the flying UAV 300 so as to slide along the electrically conducting cables 610A and 610B. The guiding portion 610 may thus define a path and may physically guide the travel of the movable tethering apparatus 600 along the path as the movable tethering apparatus 600 is pulled by the flying UAV 300. The electrically conducting cables 610A and 610B are supported off of the ground by support structures 611A and 611B. In various implementations, the support structures 611A and 611B may be in the form of short posts or other structures for supporting the cables 610A and 610B at positions that are off of the ground but which are still relatively near to the ground.

As illustrated in FIG. 6, the movable tethering apparatus 600 includes a body 601, the weighted component 603, end portions 604A and 604B, an eye hook 606 and electrical contact portions 608A and 608B. In various implementations, the body 601 may be formed from a flexible aluminum sheet, or similar materials. The weighted component 603 helps hold the body 601 and associated end portions 604A and 604B down and in contact with the cables 610A and 610B as the movable tethering apparatus 600 is pulled along the cables by an attached UAV 300 flying above (not shown). In various implementations, the end portions 604A and 604B may generally be C-shaped, and may be located around the cables 610A and 610B as the movable tethering apparatus 600 is slid along the cables. In this manner, the C-shaped portions 604A and 604B function as engaging elements of the movable tethering apparatus 600 which engage the cables 610A and 610B and enable the movable tethering apparatus 600 to move along the cables.

The electrical contact portions 608A and 608B may consist of the inner surfaces of the end portions 604A and 604B which maintain electrical contact with the electrically conducting cables 610A and 610B while the movable tethering apparatus 600 is slid along the cables. While for purposes of illustration the electrical contact portions 608A and 608B are shown slightly above the electrically conducting cables 610A and 610B, it will be appreciated that during operation the electrical contact portions 608A and 608B will be in direct contact with the electrically conducting cables 610A and 610B. A pair of wires 632A and 632B of a tether section 632 conduct electricity from the electrical contact portions 608A and 608B through the tether 630 to an attached UAV (not shown) for powering the flight of the UAV.

The eye hook 606 helps securely attach the tether section 632 and associated wires 632A and 632B to the movable tethering apparatus 600. In the configuration of FIG. 6, if an attached UAV 300 pulls too hard on the tether 630, the movable tethering apparatus 600 may be pulled off of the cables 610A and 610B, so as to stop the flow of electricity for powering the flight of the UAV 300. This feature which occurs if the UAV 300 attempts to fly too far from the guiding portion 610 may be designed to address certain government or other regulations which limit the untethered flight of UAVs in outdoor environments.

FIG. 7 depicts a diagram of a cross-sectional end view of a movable tethering apparatus 700 including a clip 703D for engaging a securing cable 703C for maintaining sliding contact with a guiding portion 710 which includes a pair of electrically conducting cables 710A and 710B, according to an implementation. Certain features of the movable tethering apparatus 700 are similar to features of the movable tethering apparatus 600 of FIG. 6, and will be understood to operate similarly, except as otherwise described below. As will be described in more detail below, during a flight of an attached UAV 300 the movable tethering apparatus 700 may be pulled by the flying UAV 300 so as to slide along the electrically conducting cables 710A and 710B. The guiding portion 710 may thus define a path and may physically guide the travel of the movable tethering apparatus 700 along the path as it is pulled behind the flying UAV 300. The cables 710A and 710B are supported off of the ground by support structures 711 including branch support portions 711A and 711B, which may also support the securing cable 703C, as will be described in more detail below.

As illustrated in FIG. 7, the movable tethering apparatus 700 includes a body 701, the clip 703D, a pair of end portions 704A and 704B, an eye hook 706 and electrical contact portions 708A and 708B. The end portions 704A and 704B of the body 701 may generally be C-shaped, and may be located around the cables 710A and 710B as the movable tethering apparatus 700 is slid along the cables. In this manner, the C-shaped portions 704A and 704B function as engaging elements of the movable tethering apparatus 700 which engage the electrically conducting cables 710A and 710B and enable the movable tethering apparatus 700 to move along the cables. The electrical contact portions 708A and 708B may consist of the inner surfaces of the end portions 704A and 704B which maintain electrical contact with the electrically conducting cables 710A and 710B as the movable tethering apparatus 700 is slid along the cables. A pair of wires 732A and 732B of a tether section 732 conduct electricity from the electrical contact portions 708A and 708B through the tether 730 to an attached UAV (not shown) for powering the flight of the UAV. The eye hook 706 helps secure the tether section 732 and associated wires 732A and 732B to the movable tethering apparatus 700.

The clip 703D around the securing cable 703C helps maintain the movable tethering apparatus 700 in contact with the cables 710A and 710B as the movable tethering apparatus 700 is pulled by a UAV 300 (not shown) as attached to the tether 730. In various implementations, the configuration of the securing cable 703C and clip 703D may be utilized as an alternative to the weighted component 603 that is provided for the movable tethering apparatus 600 of FIG. 6. During a tethered flight, if the attached flying UAV 300 pulls too hard on the tether 730, the clip 703D may be configured to decouple from the body 701, and the end portions 704A and 704B may then be pulled off of the cables 710A and 710B, so as to stop the flow of the electricity for powering the flight of the UAV 300. This feature which occurs if the UAV 300 attempts to fly too far away from the guiding portion 710 may be designed to address certain government or other regulations which limit the untethered flight of UAVs in outdoor environments.

FIG. 8 depicts a diagram of a side view of a movable tethering apparatus 800 including a pulley 804A for maintaining rolling contact with a guiding portion 810 which includes an electrically conducting cable 810A, according to an implementation. As will be described in more detail below, during a flight of an attached UAV 300, the movable tethering apparatus 800 may be pulled by the flying UAV 300 so as to slide along the electrically conducting cable 810A. The guiding portion 810 may thus define a path (e.g., as indicated by the arrows 850) and may physically guide the travel of the movable tethering apparatus 800 along the path as it is pulled behind the flying UAV 300. In various implementations, the guiding portion 810 may also include a second electrically conducting cable, and the movable tethering apparatus 800 may include a second configuration identical to that illustrated in FIG. 8 for sliding along the second electrically conducting cable. In such configurations, the two portions of the movable tethering apparatus 800 may be connected together, and a tether 830 may include a tether section 832A as well as a second tether section for coupling to the second portion of the movable tethering apparatus 800.

As shown in FIG. 8, the illustrated portion of the movable tethering apparatus 800 includes a body 801A, a weighted component 803A, a pulley 804A, an eye hook 806A, and an electrical contact portion 808A. The weighted component 803A helps maintain the pulley 804A in contact with the cable 810A as the movable tethering apparatus 800 is pulled from above by an attached flying UAV 300. In this manner, the pulley 804A functions as an engaging element of the movable tethering apparatus 800 which engages the electrically conducting cable 810A and enables the movable tethering apparatus 800 to move along the cable.

The electrical contact portion 808A electrically couples to the electrically conducting cable 810A as the movable tethering apparatus 800 is slid along the cable 810A. A wire 832A of a tether section 832 conducts electricity from the electrical contact portion 808A through a tether 830 to an attached UAV 300 (not shown) for powering the flight of the UAV. The eye hook 806A helps securely attach the wire 832A to the movable tethering apparatus 800. As noted above, during a tethered flight operation, as an attached UAV 300 flies back and forth above, the movable tethering apparatus 800 may correspondingly be pulled back and forth along a path as indicated by the arrows 850 and as defined by the guiding portion 810.

In various implementations, the electrical contact portion 808A may be held in place against the electrically conducting cable 810A by a clip or other mechanism that may be configured to open or otherwise allow the electrical contact portion 808A to swing or drop down if sufficient force is applied. In such a configuration, if during a tethered flight the attached flying UAV 300 pulls too hard on the tether 830, the clip or other mechanism holding the electrical contact portion 808A may open or otherwise allow the electrical contact portion 808A to move away from the electrically conducting cable 810A, so as to stop the flow of the electricity for powering the flight of the UAV 300. This feature which occurs if the UAV 300 attempts to fly too far away from the guiding portion 810 may be designed to address certain government or other regulations which limit the untethered flight of UAVs in outdoor or other environments.

Figure 9:
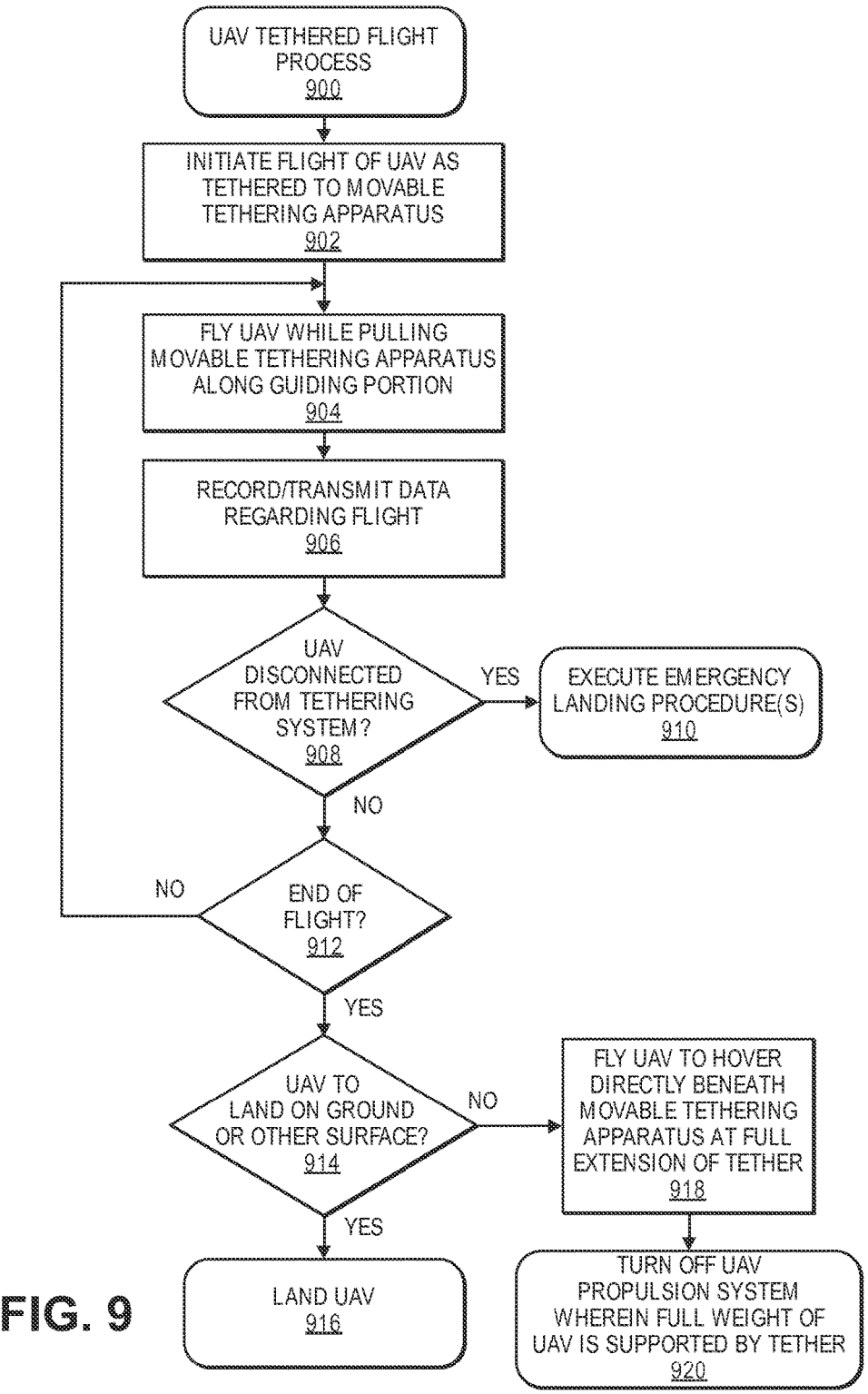
FIG. 9 depicts a flow diagram of a tethered flight process, according to some implementations.

FIG. 9 depicts a flow diagram of an example UAV tethered flight process 900, according to some implementations. This process, and each process described herein, may be implemented by the architectures described herein or by other architectures. This process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

The example process 900 begins with initiating a flight of the UAV as tethered to a movable tethering apparatus, as in 902. In various implementations, the initiating of the flight may include turning on a propulsion system (e.g., propeller motors, etc.) of the UAV so as to allow the UAV to take off from its current location. As described above, the movable tethering apparatus that the UAV is tethered to may roll or slide along a guiding portion (e.g., a pipe, track, trough, cable, etc.). In one implementation, the guiding portion may be on or near the ground wherein the UAV may take off from the ground and may generally fly above the guiding portion. In an alternative implementation, the guiding portion may be attached to a ceiling or other elevated structure wherein the UAV may initially be hanging in the air at the end of the tether, from where the UAV may start the flight process and may generally continue to fly below the guiding portion.

Once the flight has been initiated, the UAV is flown while pulling the movable tethering apparatus along the guiding portion, as in 904. In various implementations, the flying may be performed as part of various test flights for the UAV. For example, it may be desirable to test the maneuverability, endurance, exerted forces, maximum weight capacity, etc., for a UAV. As another example, in a configuration where electricity is conducted through the tether for powering the UAV, endurance testing may be performed for the UAV without requiring the UAV to stop for recharging or changing the batteries, etc.

As another example, the configuration utilizing the movable tethering apparatus may be in combination with a relatively long guiding portion (e.g., 100 feet, 500 feet, 1,000 feet, ¼ mile, etc.) which may be particularly applicable for testing maximum flying speeds (e.g., 30 mph, 60 mph, etc.) of the UAV. In such configurations, it may be desirable to fly the UAV in a direction that is parallel to the guiding portion so as to allow at least part of the length of the guiding portion to be utilized for the test flight. In various implementations, flying parallel to the guiding portion may also generally cause the movable tethering apparatus to be pulled along the guiding portion at approximately the same speed that the UAV is flying, thus reducing variations in the resistance produced by the movable tethering apparatus. For example, flying in non-parallel directions may generally cause variations in the direction and/or amount of pull on the movable tethering apparatus, which may correspondingly produce variations the speed and resistance of the movable tethering apparatus, which may correspondingly affect the flight of the UAV. This example also illustrates why it is desirable to configure the movable tethering apparatus to be able to move at high speeds (e.g., 30 mph, 60 mph, etc.) along the guiding portion with a relatively low and consistent resistance (e.g., so as to have minimal effect on the flying of the UAV).

As the UAV is flown, data regarding the flight is recorded and/or transmitted, as in 906. In various implementations, as part of a testing of the UAV's capabilities, data may be measured by sensors on the UAV, and/or by external sensors of the tethering system at other locations. For example, a speed of the UAV may be determined utilizing sensors on the UAV and/or external speed detecting sensors that are located at other locations in the flying area. As another example, energy efficiency, forces exerted during flight maneuvers, etc., may be recorded by various sensors on the UAV. As part of such measurements, the weight/resistance of the tether and/or the movable tethering apparatus that is pulled along the guiding portion may be considered as a factor and included in any calculations regarding the performance of the UAV 300. In configurations where the UAV is recording the data regarding the flight, the data may be wirelessly transmitted by the UAV during the flight and/or may be recorded in a memory to be accessed later for further evaluation after the flight is complete.

In addition to the recording of the data, during the flight a determination is also made as to whether the UAV has become disconnected from the tethering system, as in 908. In various implementations, a disconnection may occur if part of the tethering system breaks, or may be designed to occur if a certain amount of force is exerted by the UAV attempting to fly beyond the limits of the tethering system. For example, a disconnection may occur if the UAV pulls too hard on the tether so as to cause the movable tethering apparatus to disengage and/or otherwise lose contact with the guiding portion (e.g., see FIGS. 5 and 6). As another example, a disconnection may occur if the tether, or another coupling component of the tethering system, breaks. If the UAV becomes disconnected from the tethering system, an emergency landing procedure may be executed, as in 910. In various implementations, the emergency landing procedure may be designed to ensure that the UAV is not damaged and does not cause damage or endanger people or property during the emergency landing. For example, in a configuration where the tethering system provides electricity for powering the flight of the UAV, an emergency power supply may be utilized for powering the safe and controlled landing of the UAV during the emergency landing procedure. Such an emergency power supply may be configured to only be utilized for emergency landings, so as to comply with various government or other regulations which may restrict certain types of untethered UAV flight outdoors. In accordance with such regulations, the emergency power supply may also include only a relatively small amount of energy so as to limit the distance and/or time that the UAV is able to fly if the UAV becomes disconnected from the tethering system (e.g., less than two minutes, one minute, thirty seconds, etc.).

If during the flight the UAV does not become disconnected from the tethering system, as in 908, a determination is made as to whether the end of the flight has been reached, as in 912. If the end of the flight has not been reached, the UAV continues to fly, as in 904. If the end of the flight has been reached, a determination is made as to whether the UAV is to land on a ground or other surface, as in 914. If the UAV is to land on a ground or other surface, the UAV is landed, as in 916. If the UAV is not to land on a ground or other surface, the UAV is flown to hover directly beneath the movable tethering apparatus at the full extension of the tether, as in 918. For example, in a configuration where the guiding portion is attached to a ceiling or other elevated structure, the tether may intentionally be too short to allow the UAV to reach the ground (e.g., preventing crashes or other impacts). In such configurations, once the UAV is flown to hover at the full extension of the tether, the UAV propulsion system (e.g., propeller motors) may be turned off so as to allow the full weight of the UAV to be supported in the air by the tether, as in 920.

It will be appreciated that by hovering the UAV beneath the movable tethering apparatus at the full extension of the tether before the propulsion system is turned off, the UAV is prevented from falling or otherwise swinging at the end of the tether when the flight is complete. For example, if the propulsion system were turned off while the UAV was not at the full extension of the tether, the UAV could potentially fall, resulting in undesirable stresses placed on the tether, guiding portion and/or associated attachments to the UAV. In addition, if the propulsion system is stopped while the UAV is not directly beneath the movable tethering apparatus, the UAV may subsequently swing back and forth at the end of the tether beneath the movable tethering apparatus.

In various implementations, the UAV may be made to hover directly beneath the movable tethering apparatus in part by flying the UAV lower and lower, which will cause the movable tethering apparatus to be pulled along the guiding portion to a location that is generally above the UAV. In various implementations, a location along the guiding portion may be selected for the end of the flight. For example, in a configuration where the guiding portion is relatively long (e.g., 500 feet, 1,000 feet, ¼ mile, etc.), it may be desirable to stop the flight of the UAV at a location near a user, examining station, etc., rather than requiring a user to walk or otherwise travel an extensive distance to reach the UAV.

Figure 10:
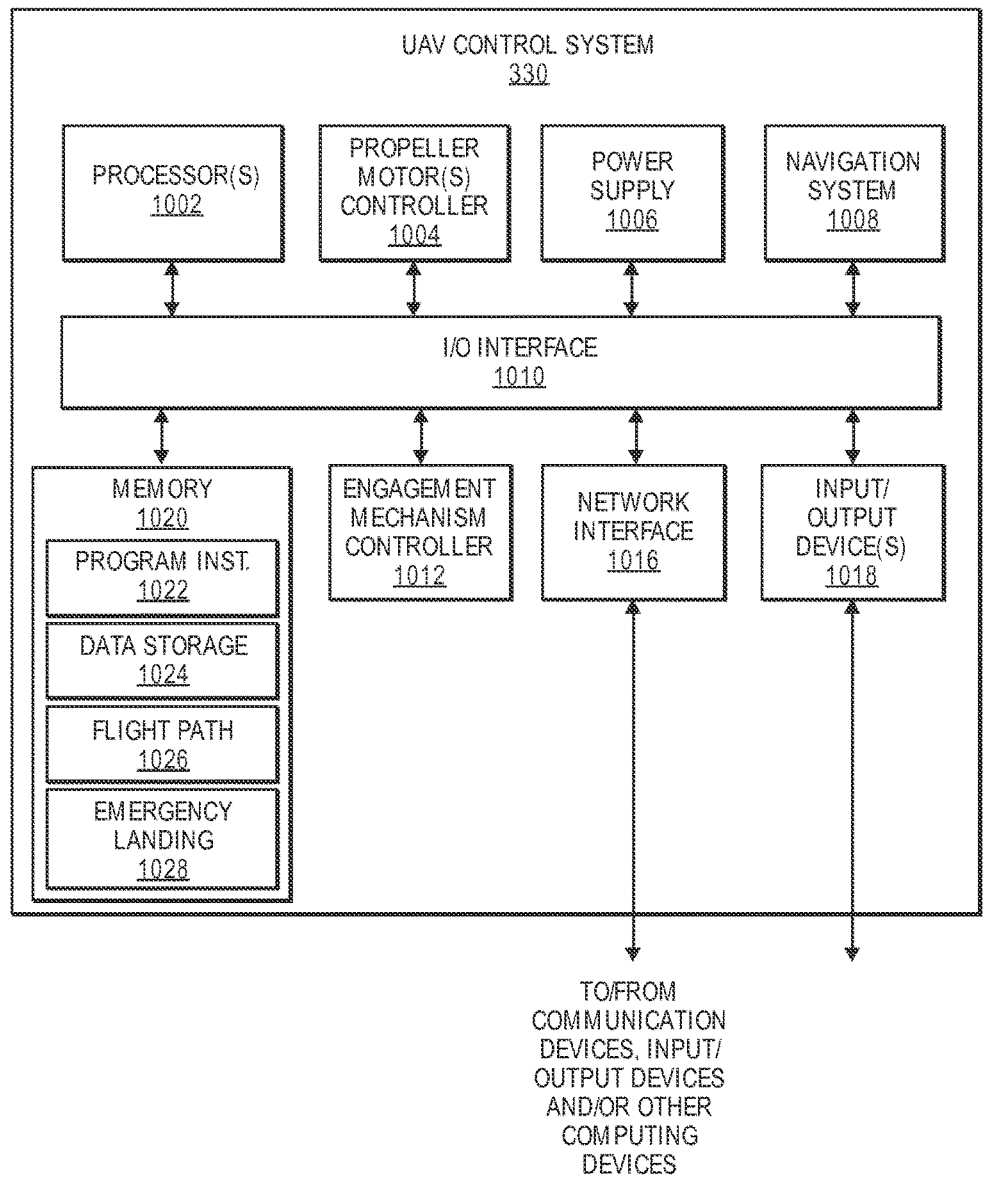
FIG. 10 is a block diagram illustrating various components of an unmanned aerial vehicle control system, according to an implementation.

FIG. 10 is a block diagram illustrating an example UAV control system 330 of a UAV 300. In various examples, the block diagram may be illustrative of one or more aspects of the UAV control system 330 that may be used to implement the various systems and methods discussed above. In the illustrated implementation, the UAV control system 330 includes one or more processors 1002, coupled to a non-transitory computer readable storage medium 1020 via an input/output (I/O) interface 1010. The UAV control system 330 may also include a propeller motor controller 1004, power supply module 1006, and/or a navigation system 1008. The UAV control system 330 further includes an engagement mechanism controller 1012, a network interface 1016, and one or more input/output devices 1018.

In various implementations, the UAV control system 330 may be a uniprocessor system including one processor 1002, or a multiprocessor system including several processors 1002 (e.g., two, four, eight, or another suitable number). The processor(s) 1002 may be any suitable processor capable of executing instructions. For example, in various implementations, the processor(s) 1002 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1002 may commonly, but not necessarily, implement the same ISA.

The non-transitory computer readable storage medium 1020 may be configured to store executable instructions and/or data items accessible by the processor(s) 1002. In various implementations, the non-transitory computer readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1020 as program instructions 1022, data storage 1024, flight path data 1026 and emergency landing data 1028, respectively. In other implementations, program instructions, flight path data, emergency landing data and/or other data may be received, sent, or stored upon different types of computer-accessible media, such as non-transitory media, or on similar media separate from the non-transitory computer readable storage medium 1020 or the UAV control system 330. Generally speaking, a non-transitory, computer readable storage medium may include storage media or memory media such as magnetic or optical media, e.g., disk or CD/DVD-ROM, coupled to the UAV control system 330 via the I/O interface 1010. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1016.

In one implementation, the I/O interface 1010 may be configured to coordinate I/O traffic between the processor(s) 1002, the non-transitory computer readable storage medium 1020, and any peripheral devices, the network interface or other peripheral interfaces, such as input/output devices 1018. In some implementations, the I/O interface 1010 may perform any necessary protocol, timing or other data transformations to convert data signals from one component (e.g., non-transitory computer readable storage medium 1020) into a format suitable for use by another component (e.g., processor(s) 1002). In some implementations, the I/O interface 1010 may include support for devices attached through various types of peripheral buses, such as a variant of the Peripheral Component Interconnect (PCI) bus standard or the Universal Serial Bus (USB) standard, for example. In some implementations, the function of the I/O interface 1010 may be split into two or more separate components, such as a north bridge and a south bridge, for example. Also, in some implementations, some or all of the functionality of the I/O interface 1010, such as an interface to the non-transitory computer readable storage medium 1020, may be incorporated directly into the processor(s) 1002.

The propeller motor(s) controller 1004 communicates with the navigation system 1008 and adjusts the power of each propeller motor to fly the UAV along a determined flight path (e.g., as part of a tethered flight). As described above, in various implementations, the UAV may be flown as part of various testing procedures (e.g., for testing speed, energy efficiency, carrying capacity, maneuverability, forces exerted, etc.). The power supply module 1006 may control the charging and any switching functions associated with one or more power modules (e.g., batteries) of the UAV. As described above, in various implementations an emergency power supply (e.g., a battery, capacitor, other energy storage device, etc.) may be provided for use during an emergency landing procedure (e.g., as controlled by the emergency landing instructions 1028). In an implementation where electricity is conducted through the tether for powering the flight of the UAV, the power supply module 1006 may control any switching and utilization of the supplied electricity (e.g., for powering the propeller motors, charging any emergency power supplies, etc.), as well as any switching to an emergency power supply during an emergency landing.

The navigation system 1008 may include or access data regarding the configuration of the tethering system (e.g., for flying the UAV in a direction parallel to the guiding portion during certain procedures, etc.). GPS capabilities or other coordinate system navigation techniques may also be utilized in combination with the known locations of certain tethering system components (e.g., the location and layout of the guiding portion) for flying the UAV. The engagement mechanism controller 1012 communicates with the motor(s) (e.g., a servo motor) used to engage and/or disengage items to be carried during tethered flights. For example, test flights may be conducted for determining the carrying capacity, maneuverability, etc. of a UAV when carrying a load.

The network interface 1016 may be configured to allow data to be exchanged between the UAV control system 330 and other devices attached to a network, such as other computer systems. For example, the tethering system may include or work in conjunction with a central control system for controlling the flight of the UAV and/or for measuring, recording, analyzing, etc., data regarding test flights of the UAV while attached to the tethering system. In various implementations, the network interface 1016 may support communication via wireless general data networks, such as a Wi-Fi network. For example, the network interface 1016 may support communication via telecommunications networks such as cellular communication networks, satellite networks, and the like.

Input/output devices 1018 may, in some implementations, include one or more displays, image capture devices, thermal sensors, infrared sensors, time of flight sensors, accelerometers, pressure sensors, airflow sensors, speed sensors, etc. For example, such sensors may be utilized for measuring certain aspects regarding a tethered flight, such as speed, energy efficiency, carrying capacity, maneuverability, forces exerted, etc. Multiple such input/output devices 1018 may be present and controlled by the UAV control system 330. Certain sensors may also be utilized to assist with navigation during tethered flights as well as landings.

As shown in FIG. 10, the memory may include program instructions 1022 which may be configured to implement the example processes and/or sub-processes described above. The data storage 1024 may include various data stores for maintaining data items that may be provided for determining flight paths, landing, executions of test flight maneuvers, etc. The emergency landing instructions 1028 may be configured to implement the example emergency landing procedures described above, such as determining when the UAV has become disconnected from the tethering system, and in response thereto utilizing an emergency power supply and/or other procedures for safely landing the UAV. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 330 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV control system 330 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 330. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 330 may be transmitted to the UAV control system 330 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system for conducting tethered test flights, the system comprising:
   an unmanned aerial vehicle ("UAV") comprising a propulsion system that is controlled to fly the UAV for a tethered test flight to test the capabilities of the UAV;
   a tether coupled to the UAV;
   a movable tethering apparatus comprising one or more engaging elements, wherein:
     the tether is coupled between the movable tethering apparatus and the UAV;
     the movable tethering apparatus is configured to be pulled by the UAV as moved by the propulsion system of the UAV during the tethered test flight; and
     at least one of a weight or a resistance of at least one of the movable tethering apparatus or the tether is included in a calculation regarding the performance of the UAV during the tethered test flight;
   a guiding portion that defines a path that is approximately straight over a length of the path, wherein the one or more engaging elements of the movable tethering apparatus engage the guiding portion and enable the movable tethering apparatus to move along the guiding portion and to correspondingly follow the path as the movable tethering apparatus is pulled by the UAV, wherein the propulsion system of the UAV is controlled to fly the UAV which pulls the movable tethering apparatus along the guiding portion during the tethered test flight of the UAV;
   one or more sensors that measure test flight data regarding at least one of energy efficiency, carrying capacity, maneuverability, or force exerted during a flight maneuver as part of testing the capabilities of the UAV during the tethered test flight; and
   a computing system, comprising:
     one or more processors; and
     a memory coupled to the one or more processors and storing program instructions that when executed by the one or more processors cause the one or more processors to at least:
       record the test flight data regarding at least one of energy efficiency, carrying capacity, maneuverability, or force exerted during a flight maneuver as measured by the one or more sensors during the tethered test flight; and
       perform a calculation regarding the performance of the UAV during the tethered test flight, wherein at least one of a weight or a resistance of at least one of the movable tethering apparatus or the tether is included in the calculation.

2. The system of claim 1, wherein the guiding portion includes at least one of a cable, a pipe, a track, or a trough along which the movable tethering apparatus moves.

3. The system of claim 1, wherein the one or more engaging elements of the movable tethering apparatus include at least one of a wheel, a bracket, a circular opening, a shaped portion, or a pulley for engaging the guiding portion.

4. The system of claim 1, wherein the guiding portion is attached to a ceiling or other elevated structure and the tether is shorter than a distance between the guiding portion and a ground so as to prevent the UAV from impacting the ground while the tether is attached to the UAV.

5. The system of claim 1, wherein at least part of the guiding portion is attached to a ground, and a length of the tether limits a height to which the UAV can fly while the tether is attached to the UAV.

6. The system of claim 1, wherein electricity is provided through the tether for powering the propulsion system of the UAV.

7. The system of claim 1, wherein the UAV includes an emergency power supply that is utilized to power the propulsion system to fly the UAV and land the UAV when the UAV is disconnected from the tether during the tethered test flight.

8. The system of claim 1, wherein:
   the guiding portion is attached to an elevated structure and the tether extends down from the movable tethering apparatus and includes an upper portion that is coupled to the movable tethering apparatus and a multi-point harness that is coupled to the UAV; and
   the overall length of the tether including the upper portion and the multi-point harness is shorter than a distance between the guiding portion and a ground so as to prevent the UAV from impacting the ground while the tether is attached to the UAV.

9. A system, comprising:
   a tethering system for use with an unmanned aerial vehicle ("UAV") to conduct tethered test flights, the tethering system comprising:
     a tether coupled to a UAV, wherein the UAV comprises a propulsion system that is controlled to fly the UAV for a tethered test flight to test the capabilities of the UAV;
     a movable tethering apparatus to which the tether is attached, wherein the movable tethering apparatus is configured to be pulled by the UAV as moved by the propulsion system of the UAV during the tethered test flight; and
     a guiding portion that physically guides a movement of the movable tethering apparatus as the movable tethering apparatus is pulled by the flying UAV that is coupled to the tether, wherein the propulsion system of the UAV is controlled to fly the UAV which pulls the movable tethering apparatus along the guiding portion during the tethered test flight of the UAV; and
   a computing system, comprising:
     one or more processors; and
     a memory coupled to the one or more processors and storing program instructions that when executed by the one or more processors cause the one or more processors to at least:
       utilize one or more sensors to measure test flight data regarding at least one of energy efficiency, carrying capacity, maneuverability, or force exerted during a flight maneuver as part of testing the capabilities of the UAV during the tethered test flight; and perform a calculation regarding the performance of the UAV during the tethered test flight, wherein at least one of a weight or a resistance of at least one of the movable tethering apparatus or the tether is included in the calculation.

10. The system of claim 9, further comprising a tether retraction mechanism that retracts the tether to prevent a slack portion of the tether from occurring when the propulsion system is controlled to fly the UAV closer to the movable tethering apparatus.

11. The system of claim 9, wherein the tether conducts electricity to the flying UAV to power the propulsion system of the flying UAV.

12. The system of claim 11, wherein the electricity is conducted from the guiding portion and the movable tethering apparatus includes one or more electrical contact portions that electrically couple to the guiding portion.

13. The system of claim 9, wherein the movable tethering apparatus includes one or more engaging elements that engage the guiding portion.

14. The system of claim 9, wherein the movable tethering apparatus includes at least one of a weighted component or a clip that assists with maintaining the movable tethering apparatus in contact with the guiding portion while the movable tethering apparatus is pulled along the guiding portion by the flying UAV.

15. The system of claim 9, wherein:
the guiding portion is attached to an elevated structure and the tether extends down from the movable tethering apparatus and includes an upper portion that is coupled to the movable tethering apparatus and a multi-point harness that is coupled to the UAV; and
the overall length of the tether including the upper portion and the multi-point harness is shorter than a distance between the guiding portion and a ground so as to prevent the UAV from impacting the ground while the tether is attached to the UAV.

16. The system of claim 9, wherein the guiding portion includes at least one of a pipe, a trough, a track, or a cable.

17. The system of claim 9, wherein the guiding portion is at least 100 feet long.

18. A computer implemented method to perform a tethered test flight of an unmanned aerial vehicle ("UAV"), the computer implemented method comprising:
under control of one or more computing systems configured with executable instructions,
controlling a propulsion system of the UAV to initiate a tethered test flight of the UAV to test the capabilities of the UAV while a tether is coupled between the UAV and a movable tethering apparatus, wherein the movable tethering apparatus is pulled by the UAV as moved by the propulsion system of the UAV during the tethered test flight;
controlling the propulsion system of the UAV to fly the UAV so as to pull the movable tethering apparatus along a guiding portion which physically guides a movement of the movable tethering apparatus during the tethered test flight;
utilizing one or more sensors to measure test flight data regarding at least one of energy efficiency, carrying capacity, maneuverability, or force exerted during a flight maneuver as part of testing the capabilities of the UAV during the tethered test flight;
ending the tethered test flight of the UAV while the tether is coupled between the UAV and the movable tethering apparatus; and
performing a calculation regarding the performance of the UAV during the tethered test flight, wherein at least one of a weight or a resistance of at least one of the movable tethering apparatus or the tether is included in the calculation.

19. The computer implemented method of claim 18, wherein during the flying the UAV is flown in a direction that is approximately parallel to the guiding portion and the movable tethering apparatus is pulled along the guiding portion at approximately a same speed that the UAV is flying.

20. The computer implemented method of claim 18, wherein:
the guiding portion is attached to an elevated structure and the tether is shorter than a distance between the guiding portion and a ground so as to prevent the UAV from impacting the ground while the tether is attached to the UAV; and
as part of the ending of the flight the propulsion system of the UAV is controlled to fly the UAV to hover directly below the movable tethering apparatus at a full extension of the tether without contacting the ground before the propulsion system is turned off.

21. The computer implemented method of claim 18, wherein
the UAV comprises an item engagement mechanism for the engagement and transport of an item by the UAV, and the computer implemented method further comprises utilizing the item engagement mechanism to engage an item that is carried by the UAV as part of testing the capabilities of the UAV during the tethered test flight.

22. The computer implemented method of claim 18, wherein:
the guiding portion is attached to an elevated structure and the tether extends down from the movable tethering apparatus and includes an upper portion that is coupled to the movable tethering apparatus and a multi-point harness that is coupled to the UAV;
the overall length of the tether including the upper portion and the multi-point harness is shorter than a distance between the guiding portion and a ground so as to prevent the UAV from impacting the ground while the tether is attached to the UAV; and
as part of the ending of the tethered test flight the propulsion system of the UAV is controlled to fly the UAV to hover directly below the movable tethering apparatus at a full extension of the tether without contacting the ground before the propulsion system is turned off.

* * * * *